(12) United States Patent
Ferrara et al.

(10) Patent No.: US 12,192,505 B2
(45) Date of Patent: Jan. 7, 2025

(54) USE OF TRANSFORMED COEFFICIENTS TO PROVIDE EMBEDDED SIGNALLING FOR WATERMARKING

(71) Applicant: V-NOVA INTERNATIONAL LIMITED, London (GB)

(72) Inventors: Simone Ferrara, London (GB); Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 316 days.

(21) Appl. No.: 17/766,114

(22) PCT Filed: Oct. 2, 2020

(86) PCT No.: PCT/GB2020/052421
§ 371 (c)(1),
(2) Date: Apr. 1, 2022

(87) PCT Pub. No.: WO2021/064414
PCT Pub. Date: Apr. 8, 2021

(65) Prior Publication Data
US 2022/0360806 A1  Nov. 10, 2022

Related U.S. Application Data

(60) Provisional application No. 62/984,261, filed on Mar. 2, 2020.

(30) Foreign Application Priority Data

Oct. 2, 2019  (GB) ..................................... 1914215
Oct. 6, 2019  (GB) ..................................... 1914414

(Continued)

(51) Int. Cl.
*H04N 19/467* (2014.01)
*H04N 19/124* (2014.01)
(Continued)

(52) U.S. Cl.
CPC ......... *H04N 19/467* (2014.11); *H04N 19/124* (2014.11); *H04N 19/154* (2014.11);
(Continued)

(58) Field of Classification Search
CPC ... H04N 19/467; H04N 19/156; H04N 19/176
See application file for complete search history.

(56) References Cited

U.S. PATENT DOCUMENTS 5,748,783 A * 5/1998 Rhoads ................. G06F 16/955
707/E17.112
6,957,350 B1 * 10/2005 Demos ................... H04N 19/59
348/E7.015

(Continued)

OTHER PUBLICATIONS

International Search Report and Written Opinion for PCT/GB2020/052421 mailed Dec. 4, 2020.
(Continued)

*Primary Examiner* — Zhubing Ren
(74) *Attorney, Agent, or Firm* — Workman Nydegger (57) ABSTRACT

Examples described herein relate to decoding and encoding signals. A method of performing signal decoding operations on one or more portions of a signal is presented. The performing is based at least in part on information embedded in one or more values received in one or more encoded data layers transmitted within a stream of encoded data, wherein said values are associated with transformed coefficients intended to be processed by a decoder for deriving elements
(Continued)

of the signal, and wherein said information comprises an indication of watermarking information associated with the signal.

18 Claims, 6 Drawing Sheets

(30) Foreign Application Priority Data

| Oct. 6, 2019 | (GB) | 1914416 |
|---|---|---|
| Oct. 25, 2019 | (GB) | 1915553 |
| Jan. 12, 2020 | (GB) | 2000430 |
| Jan. 31, 2020 | (GB) | 2001408 |
| Apr. 27, 2020 | (GB) | 2006183 |
| Jun. 30, 2020 | (GB) | 2010015 |

(51) Int. Cl.
*H04N 19/154* (2014.01)
*H04N 19/156* (2014.01)
*H04N 19/176* (2014.01)
*H04N 19/18* (2014.01)
*H04N 19/33* (2014.01)

(52) U.S. Cl.
CPC ......... *H04N 19/156* (2014.11); *H04N 19/176* (2014.11); *H04N 19/18* (2014.11); *H04N 19/33* (2014.11)

(56) References Cited

U.S. PATENT DOCUMENTS

| 2004/0133427 A1* | 7/2004 | Alattar | G06T 1/0064 |
| | | | 704/273 |
| 2006/0114338 A1* | 6/2006 | Rothschild | G06F 16/58 |
| | | | 386/E5.072 |
| 2007/0300066 A1* | 12/2007 | Srinivasan | G06T 1/0021 |
| | | | 704/E19.009 |
| 2020/0043120 A1* | 2/2020 | Megías Jimenez | H04N 19/13 |

OTHER PUBLICATIONS

Li Songbin et al., "An Information Hiding Approach Based on Integer Transform Coefficient and Virtual Space Encoding for H.264/AVC", Circuits, Systems and Signal Processing, Cambridge, MS, US, vol. 34, No. 11, Mar. 20, 2015, pp. 3573-3594, XP035547214, ISSN: 0278-081X, DOI: 10.1007/S00034-015-0024-6, retrieved on Mar. 20, 2015.

Shahid Z et al., "Spread spectrum-based watermarking for Tardos code-based fingerprinting for H.264/AVC video", 2010 17th IEEE International Conference on Image Processing (ICIP 2010), Sep. 26-29, 2010, Hong Kong, China, IEEE, Piscataway, NJ, US, Sep. 26, 2010, pp. 2105-2108, XP031814031, ISBN: 978-1-4244-7992-4 para. 3 "proposed algorithm", pp. 2106.

Su Po-Chyi et al., "A practical design of user specific watermarking in digital videos", 2013 IEEE International Conference on Multimedia and Expo (ICME), IEEE, Jul. 14, 2014, pp. 1-6, XP032639359, ISSN: 1945-7871, DOI: 10.1109/ICMEW.2014.6890638, retrieved on Sep. 3, 2014.

* cited by examiner

USE OF TRANSFORMED COEFFICIENTS TO PROVIDE EMBEDDED SIGNALLING FOR WATERMARKING

CROSS-REFERENCE TO RELATED APPLICATIONS

The present application is a 371 US Nationalization of International Patent Application No. PCT/GB2020/052421, filed Oct. 2, 2020, which claims priority to U.S. Patent Application No. 62/984,261, filed Mar. 2, 2020, and to UK Patent Application Nos: 1914215.7, filed Oct. 2, 2019, 1914416.1, filed Oct. 6, 2019, 1914414.6, filed Oct. 6, 2019, 1915553.0, filed Oct. 25, 2019, 2000430.5, filed Jan. 12, 2020, 2001408.0, filed Jan. 31, 2020, 2006183.4, filed Apr. 27, 2020, and 2010015.2, filed Jun. 30, 2020. The entire disclosures of the aforementioned applications are incorporated herein by reference.

TECHNICAL FIELD

The present invention relates to methods for processing signals, such as by way of non-limiting examples video, images, hyperspectral images, audio, point clouds, 3DoF/6DoF and volumetric signals. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats (e.g., by way of non-limiting examples, traditional single-layer DCT-based codecs, ISO/IEC MPEG-5 Part 2 Low Complexity Enhancement Video Coding SMPTE VC-6 2117, etc.), by means of different elementary streams that may or may not multiplexed in a single bitstream.

BACKGROUND

In tier-based coding formats, such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" (also referred to herein as "LoQ") of the signal, from the highest echelon at the sampling rate of the original signal to a lowest echelon, which typically has a lower sampling rate than the original signal. In the non-limiting example when the signal is a frame of a video stream, the lowest echelon may be a thumbnail of the original frame, e.g. a low resolution frame in video stream, or even just a single picture element. Other echelons contain information on corrections to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise the lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality.

Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution. Examples of these approaches are described in more detail in the available specifications for LCEVC and VC-6.

Digital watermarking technologies are known in the art. One example digital watermarking technology is the Advanced Television Systems Committee (ATSC) Video Watermark Emission Standard—A/335. The document defining this standard, e.g. as published on 20 Sep. 2016, is incorporated by reference herein.

In A/335, the top one or two lines of a video signal are used to embed watermarking information. In A/335, the luma values of pixels within these lines are modified to carry watermarking information. A receiver extracts the first one or two lines of each frame of a video signal and applies a set of thresholding operations to recover the encoded data.

One issue with A/335 and similar digital watermarking approaches is that they require the embedded data to survive various compression and transcoding operations, as well as delivery over legacy consumer High-Definition Multimedia Interface (HDMI) interfaces. To achieve robustness more complex thresholding operations are applied at the receiver. A/335 is also not intended to be tamper-resistant or indelible; it may be deliberately obliterated by an intermediary.

SUMMARY

Non-limiting embodiments illustrated herein refer to a signal as a sequence of samples (i.e., two-dimensional images, video frames, video fields, sound frames, etc.). In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As non-limiting examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, non-limiting embodiments illustrated herein often refer to signals that are displayed as 2D planes of settings (e.g., 2D images in a suitable colour space), such as for instance a video signal. The terms "picture", "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Embodiments described herein allow the efficient generation, signalling and leverage of contextual information that can be used by the decoder. Contextual information may be used along with residual data to suitably control the signal reconstruction. Such information may be efficiently embedded in the coefficients of residual data for one or more echelons of the coded signal, allowing to avoid the need for additional signalling overhead. In addition, for some non-limiting embodiments described herein, the application of certain non-essential signal enhancement operations at lower signal resolutions within the context of a hierarchical coding scheme also generates material reductions of required processing power at the decoder device.

According to first non-limiting embodiments, a signal processor (e.g., computer processor hardware) is configured to receive data and decode it ("decoder"). The decoder obtains a rendition of the signal at a first (lower) level of quality and produces a predicted rendition of the signal at a second (higher) level of quality, the second level of quality having a higher resolution (i.e., signal sampling rate) than the first level of quality. The decoder then receives and decode an echelon of residual data to apply to the predicted rendition of the signal in order to produce a corrected rendition of the signal at the second level of quality. When decoding a specific set of residual data coefficients and finding a specific set of quantized symbols, the decoder does not interpret said symbols as residual data, but instead performs watermarking operations according to the received symbols.

As such, according to a non-limiting aspect of the invention, the embedded information may comprise an indication of a feature associated with the signal, where, said feature is watermarking information. For example, said feature may be used to identify and validate the encoder that generated the data stream and/or contain information pertaining to the time and location of encoding.

In some non-limiting embodiments, watermarking information is useful, for example, to identify the nature of the signal. The watermarking information may indicate that the decoder should initiate application of watermarking of the decoded signal. In other non-limiting embodiments, the feature corresponds to a status associated with the signal. The status comprises compliance information associated with the signal. By way of non-limiting example, the compliance information may comprise any of the following information: the way the signal has been generated, the specific encoder version with which the signal has been generated, the licensing information associated with the signal and/or the encoder version which has generated the signal. The compliance information may be useful for the decoder to initiate a compliance action upon detecting that the compliance information does not match a record, such as a valid licence to generate said signal. In that case, for example, the decoder may initiate a compliance process on the signal, such as interrupting displaying or playback of the signal, sending a request to the source of the transmitted signal to obtain a valid licence, etc.

In other non-limiting embodiments, said feature identify objects in the signal. In a non-limiting embodiment, said feature allows to identify objects in the video that correspond to a unique identifier known to the decoder.

By way of non-limiting example, the feature may comprise a tag associated with one or more elements of the signal. The tag may comprise identification of whether an element of the signal can be selected by an end user of the signal. In other non-limiting embodiments, the tag may comprise identification of whether an element of the signal can be linked to an action to be taken by the end user of the signal, for example clicking on said element and/or linking to a different signal/webpage. In another non-limiting embodiment, the tag comprises identification of an element of the signal as belonging to a classification, for example a classification of a video, or a classification of an object. By way of non-limiting example, the element may represent a person, and the tag would identify who that person is. Alternatively, it may represent an object, and the tag may identify what object that is. Alternatively, it may identify what class an object belongs to. In general, the classification may comprise an association of said element with a class of identifiers, such as a category to which that element belongs.

In other non-limiting embodiments, the reserved symbols are used to embed a distinct secondary signal as part of the encoded stream, said distinct secondary signal being encoded by means of a given public key and decodable only by decoders knowledgeable about both the existence of the secondary signal and the private key corresponding to the public key used to encrypt the secondary signal.

In some non-limiting embodiments, a bit in the decoded bytestream signals to the decoder that additional information may have been embedded in some residual data coefficients, and thus that a specific set of symbols in a specific set of residual data should not be interpreted as actual residual data, but as contextual information, e.g. to inform signal reconstruction operations. In a non-limiting embodiment, some reserved symbols correspond to specific areas of the signal, i.e. whereby watermarking may be applied differentially to local patches of the reconstructed signal.

In some non-limiting embodiments, the decoder implements signal reconstruction operations in a different way (including at times not implementing them at all) based on the processing power available at the decoder device at any one time.

In some non-limiting embodiments, the decoder applies signal processing operations based on the contextual data in-loop, before applying the residual data decoded from the echelon of data that contains the embedded information. In other non-limiting embodiments, the decoder applies signal processing operations after having combined the preliminary rendition of the signal at the second level of quality with the decoded residual data. In other non-limiting embodiments, the decoder applies said signal processing operations at the end of the decoding process, after having produced a rendition of the signal at the final (highest) level of quality.

In some non-limiting embodiment, the format in which the residual data and the embedded contextual information are encoded is MPEG-5 Part 2 LCEVC ("Low Complexity Enhancement Video Coding"). In other non-limiting embodiments, the format in which the residual data and the embedded contextual information are encoded is SMPTE VC-6 ST-2117. The signal processing operations that use watermarking information may be operations that are not defined in one or more of the LCEVC or VC-6 video coding standards, e.g. comprise so-called out-of-standard operations that are nevertheless compatible with the standards. The present examples may thus be implemented as optional extensions to the aforementioned standards, or other tier-based hierarchical coding schemes.

According to second non-limiting embodiments, a signal processor (e.g., computer processor hardware) is configured to receive data and encode it ("encoder"). The encoder produces a rendition of the signal at a first (lower) level of quality and encodes it with a first coding method. It then produces a predicted rendition of the signal at a second (higher) level of quality, and correspondingly produces and encodes an echelon of residual data at the second level of quality to apply to the predicted rendition of the signal at the second level of quality in order to produce a corrected rendition of the signal at the second level of quality. In these embodiments, the encoder leverages a set of reserved symbols in a set of residual data of the echelon of residual data to signal watermarking information to the decoder.

In some non-limiting embodiments, a bit in the encoded bytestream is toggled in order to signal to the decoder whether a given set of symbols in a given set of residual data should be interpreted as actual residual data or as additional contextual information to inform signal reconstruction operations, such as watermarking processes to be applied by the decoder.

In some non-limiting embodiments, contextual information is embedded in more than one echelon of residual data.

In some non-limiting embodiment, the format used to encode the residual data and the embedded contextual information is MPEG-5 Part 2 LCEVC ("Low Complexity Enhancement Video Coding"). In other non-limiting embodiments, the format used to encode the residual data and the embedded contextual information is SMPTE VC-6 ST-2117.

According to other non-limiting embodiments, contextual signal information is embedded in encoded data generated with a non-hierarchical coding format. In a non-limiting embodiment, the symbols are embedded at macro-block level, using a set of reserved symbols in the quantized coefficients.

Further features and advantages will become apparent from the following description, given by way of example only, which is made with reference to the accompanying drawings.

DETAILED DESCRIPTION

Figure 1:
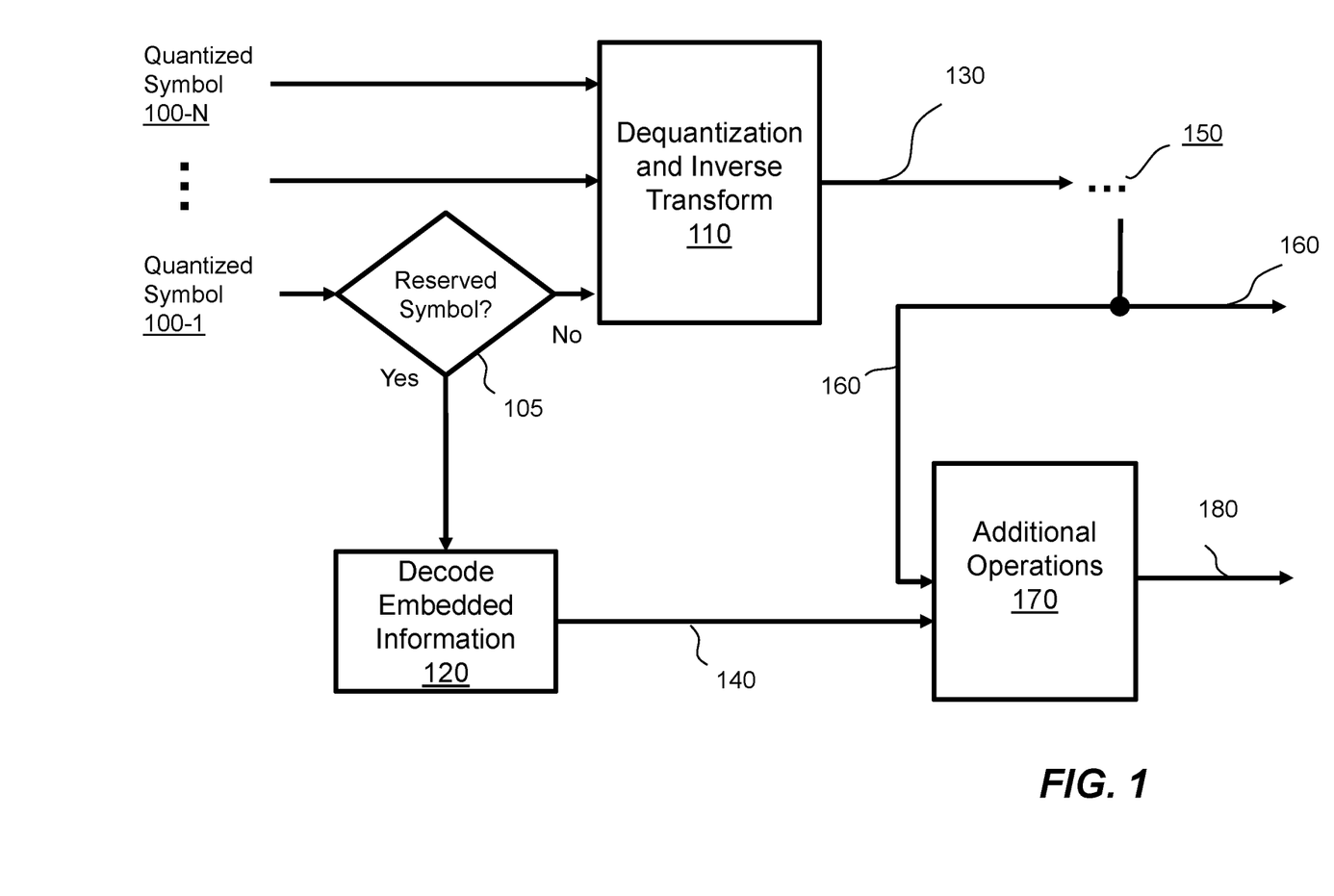
FIG. 1 shows a block diagram of an example of a decoding system in accordance with embodiments.

Referring to FIG. 1, there is shown an example of method implemented within a decoding system. A set of quantized symbols 100-1 to 100-N are received and processed. These quantized symbols comprise quantized transformed coefficients, where quantization may be optional and/or varied in degree based on encoding configurations. The quantized symbols may comprise the symbols that result from one or more of the encoded streams described with respect to later Figures. In examples described herein, information is embedded in one or more values received in one or more encoded data layers wherein said values are associated with transformed coefficients intended to be processed by a decoder for deriving elements of the signal. Receipt of example quantized and transformed coefficient symbols is described in LCEVC and VC-6. Depending on whether symbol 100-1 is to be intended as reserved symbol, the decoder follows two different approaches. In this case, the term "reserved symbol" may be considered to refer to a symbol that is reserved to carry contextual information, such as watermarking information.

If symbol 100-1 is not to be intended as reserved symbol, e.g. is intended to carry residual data for use in reconstructing the signal, its decoding follows the normal process implemented for the other symbols in the set: dequantization and reverse transform according to block 110, producing a set of decoded data 130. Said decoded data is further processed by means of Decoding Operations 150 to produce Decoded Signal 160. For example, this normal process may be a process described in a decoding specification such as LCEVC or VC-6.

If symbol 100-1 is to be intended as reserved symbol, its decoding follows a different process as indicated by Comparison block 105. At block 120, the embedded information is decoded by processing symbol 100-1 to produce watermarking information 140. The decoded signal 160 is processed along with the watermarking information 140 at block 170, where one or more additional operations 170 are performed. These may comprise enhancement operations, such as determining whether to interrupt the display of the decoded signal based on the watermarking information 140, and/or initiating a compliance process, such as checking that the encoder is properly licensed and/or has properly generated the symbols 100-1 to 100-N. The output of the additional operations 170 may comprise an enhanced reconstruction of the signal 180. For example, tags associated with one or more elements of the signal that are encoded within the watermarking information may be processed to enable actions by a user. Elements here may refer to pixels or areas of a video frame. For example, a user viewing the reconstructed video may be able to implement an action with respect to the tagged elements. In other cases, the enhanced reconstruction of the signal may include modified content based on the watermarking information.

In some non-limiting embodiments, a bit in the decoded bit or bytestream (not shown) signals to the decoder that symbol 100-1 is to be interpreted as a reserved symbol. For example, this bit may comprise a "user data" flag that is switched "on" or "off" in global configuration information as described in more detail later below. In some non-limiting embodiments, the decoder implements signal processing operations, such as additional operations 170, in a different way (including at times not implementing them at all) based on the processing power available at the decoder device at a time of processing.

Figure 2:
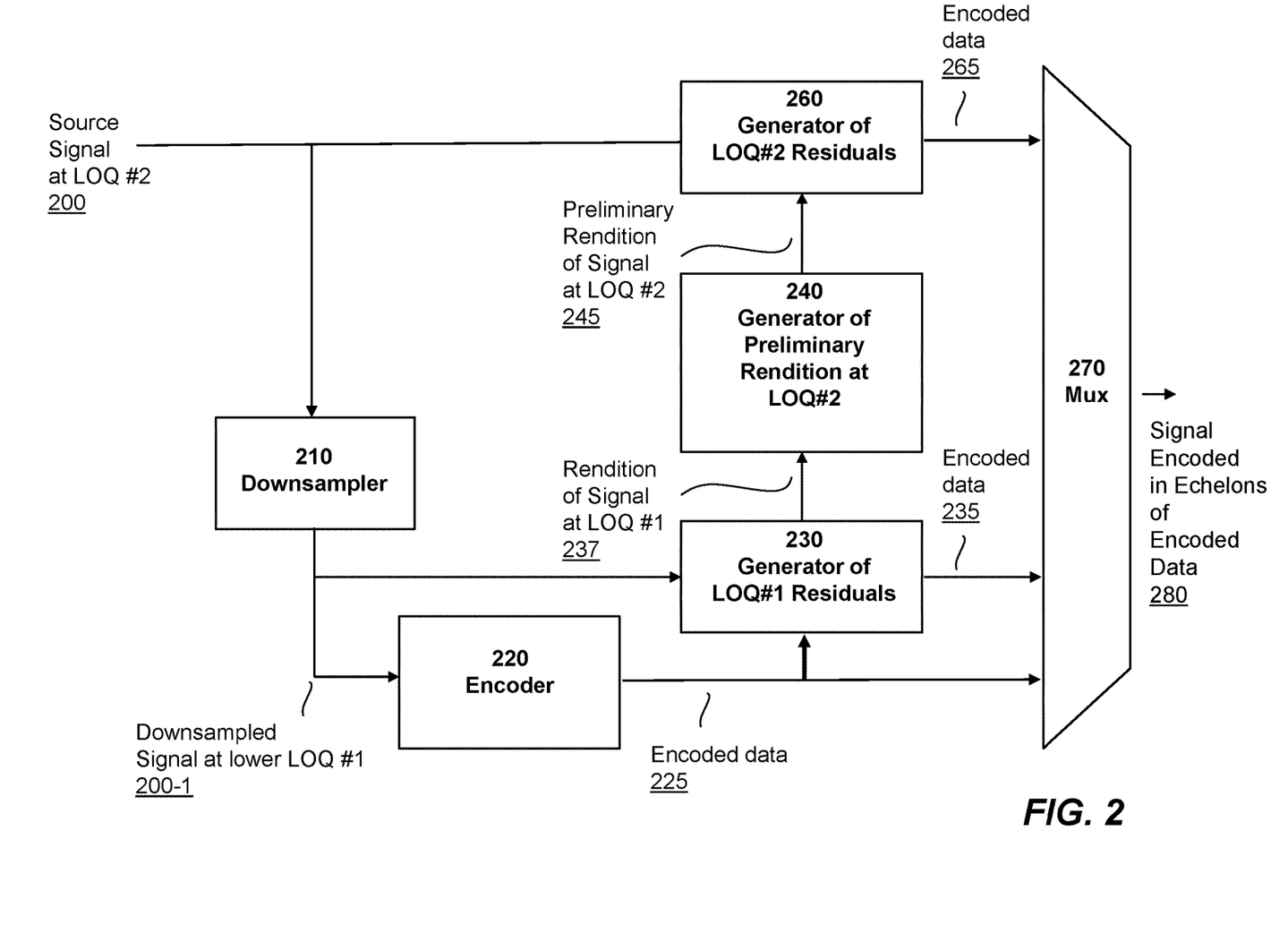
FIG. 2 shows a block diagram of an example of a hierarchical encoding system in accordance with embodiments.

Referring to FIG. 2, there is shown an example of a method implemented within an encoding system, in this case implementing a tier-based hierarchical coding method. The blocks in FIG. 2 may be implemented by an example encoder. A source signal 200 at Level of Quality #2 (e.g., full resolution and quality) is received and processed by Downsampler 210, producing Downsampled Signal 200-1. Downsampled Signal 200-1 is processed by Encoder 220, which applies a given encoding method (in some non-limiting embodiments also a tier-based hierarchical coding method, while in other non-limiting embodiments a non-hierarchical coding method), producing Encoded Data 225. The Encoder 220 may be referred to as a "base" decoder.

Encoded data 225 and Downsampled Signal 200-1 are processed by a Generator of LOQ #1 Residual Data 230 to produce Encoded Data 235 and a Rendition of Signal at LOQ #1 237. The Generator of LOQ #1 Residual Data 230 may generate a residual signal by subtracting a reconstruction based on the Encoded Data 225 from the Downsampled Signal 200-1. The Generator of LOQ #1 Residual Data 230 may also encode said residual signal by applying a coding unit transformation and quantizing the output of that transformation. A further stage of entropy encoding may also be applied. The output of the transformation and the quantization may comprise the (quantized) transformed coefficients that are modified to include embedded signalling. Rendition of Signal at LOQ #1 237 is further processed a Generator of a Preliminary Rendition at LOQ #2 240 to produce a Preliminary Rendition of Signal at LOQ #2 245. For example, this may comprise upsampling the Rendition of Signal at LOQ #1 237 with optional modifications to generate a signal at the resolution and/or sampling rate of LOQ #2.

The Preliminary Rendition of Signal at LOQ #2 245 is processed along with Source Signal 200 by a Generator of LOQ #2 Residuals 260 to produce Encoded Data 265. The Encoded Data 265 may comprise a residual signal that is generated by the Generator of LOQ #2 Residuals 260 by subtracting the Preliminary Rendition of Signal at LOQ #2 from the Source Signal 200. The Generator of LOQ #2 Residuals 260 may apply similar operations to the Generator of LOQ #1 230, but upon a residual signal at the second level of quality (e.g., at a higher resolution).

Sets of Encoded Data 225, 235 and 265 are then processed by a Multiplexer (Mux) 270 to produce Signal Encoded in Echelons of Encoded Data 280. Although all three sets of Encoded Data are multiplexed in FIG. 2, in other examples subsets may be multiplexed, e.g. Encoded Data 235 and 265 may be transmitted separately from Encoded Data 225. In VC-6, an encoded data stream may comprise all the sets of Encoded Data 225, 235, 265; in LCEVC, an encoded (enhancement) data stream may comprise Encoded Data 235 and 265 and Encoded Data 225 may form a separate base stream.

In certain described embodiments, when encoding the signal at the first level of quality, the Generator of LOQ #1 Residuals 230 produces Encoded Data 235 that leverages a set of reserved symbols in order to signal to the decoder watermarking information. This may comprise watermarking information converted from a known watermarking standard, such as A/335 discussed in the background. As is known in the art and explain in the Standard Document for A/335, watermarking information may comprise data that is embedded in a noise-tolerant signal for use by a decoder. Uses of watermarking information are varied. They include the support of programmatic elements associated with the signal, such as those needed to support interactivity, dynamic content replacement or overlay, service usage monitoring and content identification. A common use of watermarking information is to identify ownership of intellectual property rights associated with the signal, and/or elements within the signal. It should be noted that reference to elements herein includes reference to pixel or plane elements that are associated with an object in the signal that may be discerned by a human viewer. Watermarking information, also known as digital watermarks, may also be used to verify the authenticity or integrity of the signal being encoded. This watermarking information may be added during an encoding process and extracted during a decoding process.

In one case, the Generator of LOQ #1 Residuals 230 replaces quantization transformed coefficient values for a particular transformation coefficient (e.g., a particular element in a vector generated by multiplying by a transformation matrix) with embedded signalling data. Only values for one coefficient may be modified, the other coefficients may be left unmodified and encoded as per a comparative encoding for a standardised decoding procedure. A coefficient may be selected that minimises changes to the reconstructed signal, such as a H or HH coefficient for a 2 by 2 or 4 by 4 Hadamard transform.

In some non-limiting embodiments, the Generator of LOQ #1 Residuals 230 toggles a specific bit in the encoded bit- or byte-stream in order to signal to the decoder whether a given set of symbols in set of Encoded Data 235 are to be interpreted as actual residual data or as additional contextual information to inform signal decoding operations. In some non-limiting embodiments, methods 230 and 260 implement in-loop signal processing operations according to the information signalled with reserved coefficients, in order to reconstruct the signal from the Encoded Data 265.

Figure 3:
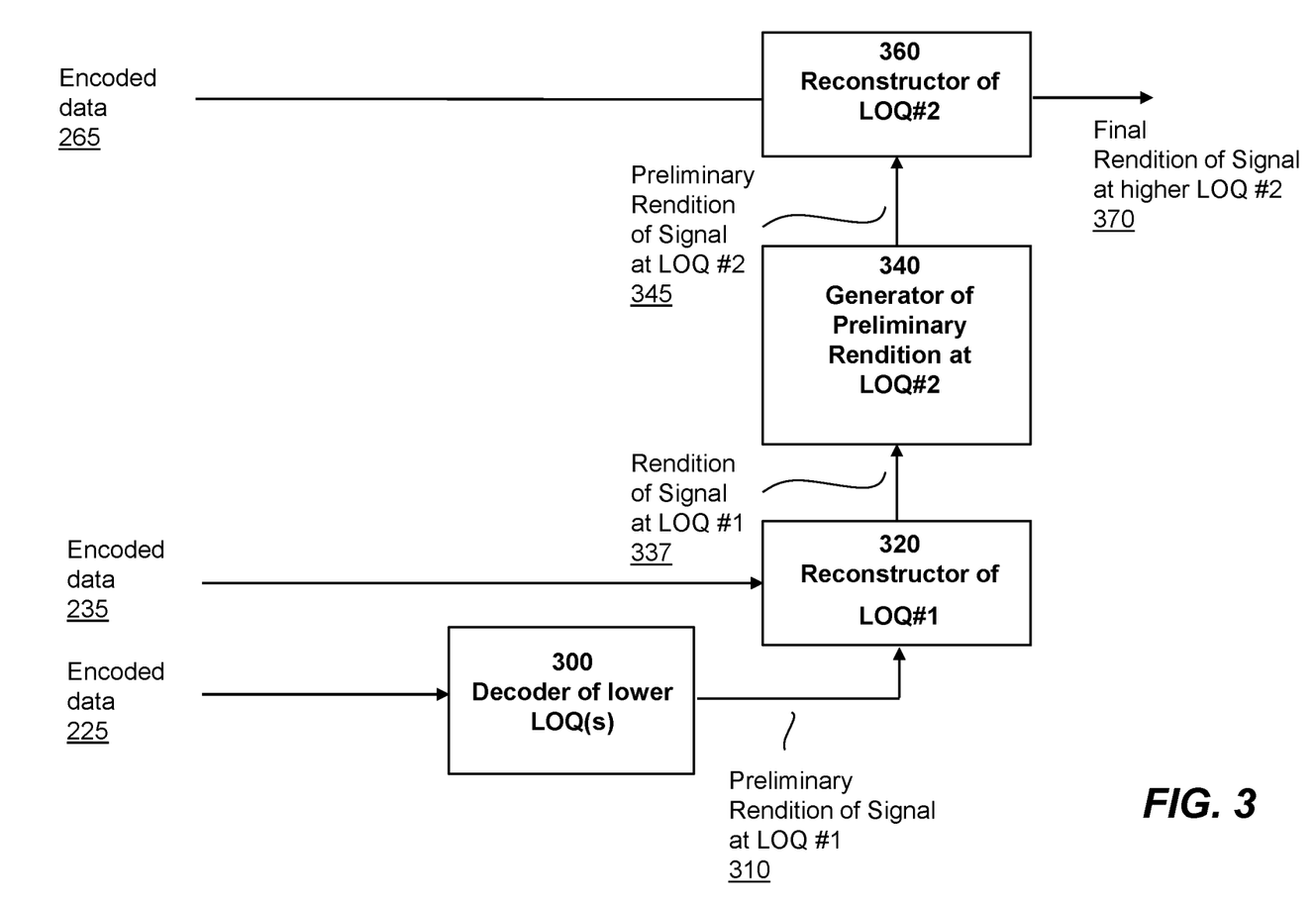
FIG. 3 shows a block diagram of a hierarchical decoding system in accordance with embodiments.

Referring to FIG. 3, there is shown an example of method implemented within a decoding system, also implementing a tier-based hierarchical coding method. The blocks in FIG. 3 may be implemented by an example decoder. Encoded Data 225 is received and processed by Decoder of Lower LOQ(s) 300. The Encoded Data 225 may be obtained by demultiplexing the Signal Encoded in Echelons of Encoded Data 280 that is received from an encoder, such as that shown in FIG. 2. The Decoder of Lower LOQ(s) 300 may be referred to as a base decoder. The Decoder of Lower LOQ(s) 300 outputs a Preliminary Rendition of Signal at LOQ #1 310.

The Preliminary Rendition of Signal at LOQ #1 310 is then processed together with Encoded Data 235 by a Reconstructor of LOQ #1 320 in order to produce Rendition of Signal at LOQ #1 337. The Encoded Data 235 may be obtained by demultiplexing the Signal Encoded in Echelons of Encoded Data 280 that is received from an encoder, such as that shown in FIG. 2. Rendition of Signal at LOQ #1 337 corresponds to Rendition 237 of Signal at LOQ #1 in FIG. 2. The Encoded Data 235 may be decoded by the Reconstructor of LOQ #1 320 and then combined with the Preliminary Rendition of Signal at LOQ #1 310. In one case, the Encoded Data 235 may comprise residual data as described in other examples herein. Decoding may comprise applying operations as indicated by blocks 110 and 410 in FIGS. 1 and 4.

Rendition of Signal at LOQ #1 337 is then processed by a Generator of Preliminary Rendition at LOQ #2 340 (which may correspond to the Generator of Preliminary Rendition at LOQ #2 240 in FIG. 2) to produce Preliminary Rendition of Signal at LOQ #2 345. The Preliminary Rendition of Signal at LOQ #2 345 is processed by a Reconstructor of LOQ #2 360, producing a Final Rendition of Signal at LOQ #2 370.

In some non-limiting embodiments, when decoding a specific set of data within Encoded Data 235 and finding a specific set of quantized symbols, the decoder does not interpret said symbols as residual data, but instead performs signal-processing operations according to the received symbols.

In some non-limiting embodiments, a bit in the decoded bytestream (not shown in FIG. 3) signals to Reconstructor of LOQ #1 320 and/or Reconstructor of LOQ #2 360 that additional information may have been embedded in some residual data coefficients, and more specifically that a specific set of quantized symbols in a specific set of residual data (or portions of said symbols) should not be interpreted as actual residual data, but as contextual information to inform signal enhancement operations.

In some non-limiting embodiments, the decoder implements signal processing operations in a different way (including at times not implementing them at all) based on the processing power available at the decoder device at the time of decoding. For example, tags and/or classifications may be extracted from reserved symbols only if processing power is available.

In some non-limiting embodiments, the decoder applies signal processing methods based on the watermarking information in-loop, before applying the residual data decoded from the echelon of data that contained the embedded watermarking information. In other non-limiting embodiments, the decoder applies the signal processing methods based on the watermarking information in-loop after having combined the preliminary rendition of the signal at the second level of quality with the decoded residual data. In other non-limiting embodiments, the decoder applies the signal processing methods based on the watermarking information at the end of the decoding process after having produced a rendition of the signal at the final (highest) level of quality. In yet other non-limiting embodiments, the decoder applies signal processing methods based on the watermarking information both in-loop and at the end of the decoding process. Certain examples are described later with respect to FIG. 4.

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695 (and the associated standard document) and the latter being described in PCT/GB2018/053552 (and the associated standard document), all of which are incorporated by reference herein. However, the concepts illustrated herein need not be limited to these specific hierarchical coding schemes. Those skilled in the art will be aware of how the above described encoder and decoder methods apply to the base and enhancement layers in LCEVC (e.g., LOQ #1 corresponds to the base layer and LOQ #2 corresponds to the enhancement layer). As such, in certain cases, the format in which Encoded Data 235, Encoded Data 265 and the corresponding embedded contextual information are encoded is MPEG-5 Part 2 LCEVC. In this case, the encoded data 235 and the encoded data 265 may comprise different enhancement sub-layers. In this case, the embedded contextual information may be referred to as "user data", as it may comprise information that falls outside of the data needed to reconstruct the signal according to the standard. In other cases, the format in which encoded data 235, encoded data 265 and the corresponding embedded contextual information are encoded is SMPTE VC-6 ST-2117. Similarly, the embedded contextual information may comprise data that is not required to reconstruct the signal according to the definition of the standard. It should be noted that references to a "frame" of video data also include references to one or more planes of colour data (e.g., luma and chroma planes) as is known from tier-based encoding approaches such as LCEVC and VC-6.

Figure 4:
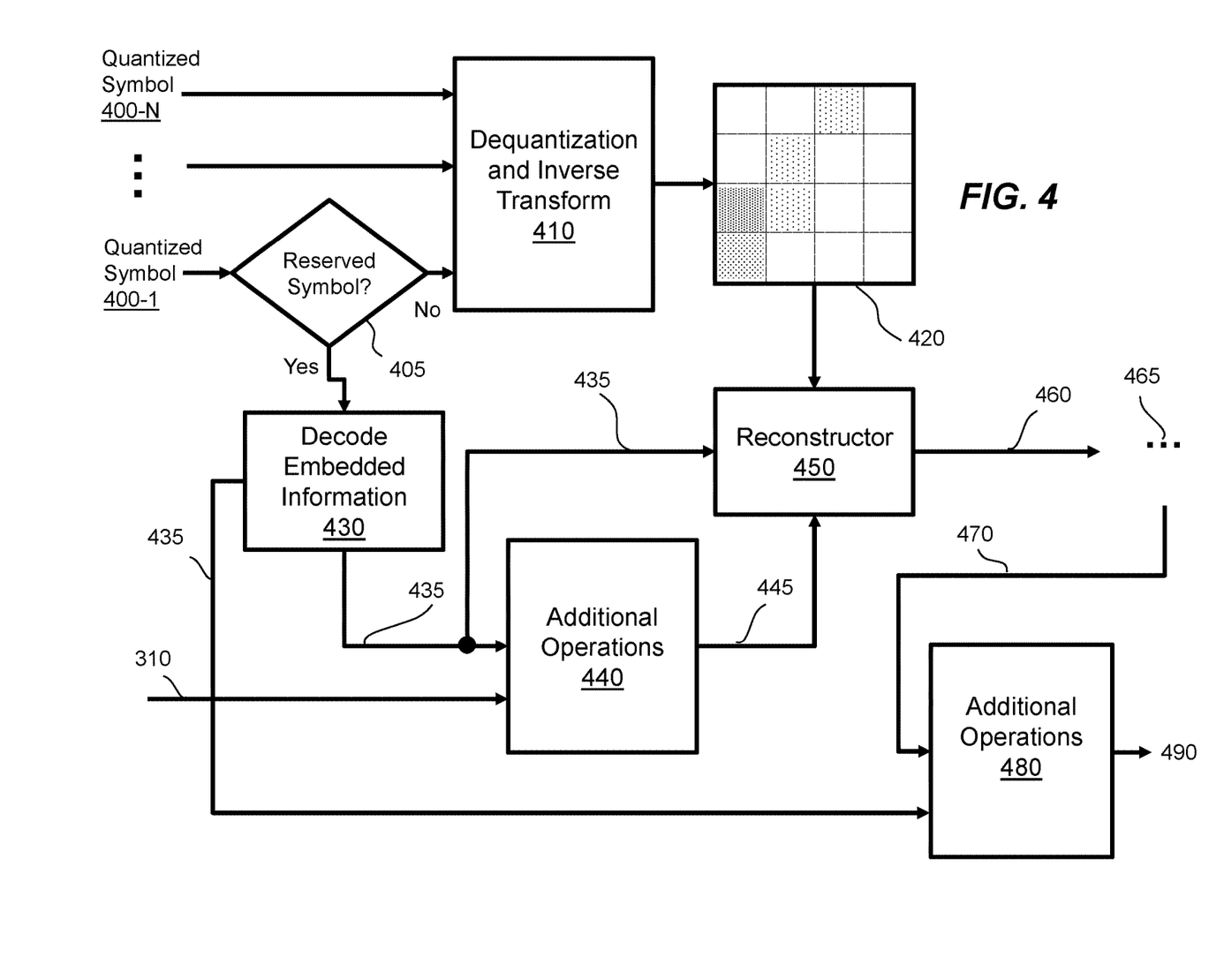
FIG. 4 shows a block diagram of another example of a hierarchical decoding system in accordance with embodiments.

Referring to FIG. 4, there is shown an example of a method implemented within a decoding system, that also implements a tier-based hierarchical coding method. The method is a variation of that shown in FIG. 2. In this variation watermarking information may be used to process one or more of a Preliminary Rendition of Signal at LOQ #1 (such as 310 from FIG. 3) and a Rendition of Signal at LOQ #2 (such as 370 from FIG. 3). As such the watermarking information may be associated with one or more levels of quality, including a base level of quality.

As shown in FIG. 2, in FIG. 4 quantized symbol 400-1 is received and processed along with other quantized symbols 400-2 . . . 400-N. The quantized symbols may represent a residual data stream at the level of Encoded Data 235. The decoder checks whether symbol 400-1 should be intended as a reserved symbol. Depending on whether symbol 400-1 is to be intended as reserved symbol, the decoder follows two different approaches.

If symbol 400-1 is not to be intended as reserved symbol, its decoding follows the normal process implemented for the other symbols in the set: Dequantization and Inverse Transform according to block 410, producing a set of decoded Residual Data 420. Said residual data is further processed by means of Reconstructor 450 (e.g., by way of non-limiting embodiment, along with other residual data for the rest of the sample of the signal) to produce Rendition of Signal at LOQ #1 460.

If symbol 400-1 is to be intended as reserved symbol, its decoding follows a different process. At block 430, a Decode Embedded Info 430 operation is initiated to process symbol 400-1 to produce watermarking information 435. In this example, the watermarking information may be used to control one or more of: Additional Operations 440, Reconstructor 450, and Additional Operations 480. For example, the watermarking information 435 may comprise compliance information and the Additional Operations 440 and 480 may comprise respective compliance processes that are performed on the Preliminary Rendition of Signal at LOQ #1 310 and a Rendition of Signal at LOQ #2 470. For example, the watermarking information may indicate that a user is only allowed access to a lower resolution video signal; in this case, the watermarking information 435 may indicate that the Preliminary Rendition of Signal at LOQ #1 310 may be processed to output a Rendition of Signal at LOQ #1 460 but that a Rendition of Signal at LOQ #2 470 is not to be output (e.g. a Final Rendition of signal at LOQ #2 490 is to be restricted). In this case, if a user is instead not allowed any access to either video stream, then both the Preliminary Rendition of Signal at LOQ #1 310 and the Rendition of Signal at LOQ #2 470 may be restricted or not output based on the watermarking information 435. In other cases, watermarking information 435 may comprise tags associated with elements of the signal at different levels of quality. The Additional Operations 440 and 480 may thus comprise generating a metadata signal associated with the main signal (e.g., a set of tags for pixels in a video signal) that allows a user to initiate actions with regard to the elements, such as clicking on elements within a rendering of one or more of the Preliminary Rendition of Signal at LOQ #1 310 and the Rendition of Signal at LOQ #2 470. For example, watermarking information 435 may comprise information associated with an object shown within the signal such as an actor or particular model of product, allowing an end user to click on pixels that are associated with that object and be provided with further information on the object.

In more detail, the Additional Operations 440 process the Preliminary Rendition of Signal at LOQ #1 310 and the watermarking information 435. This produces a Processed Preliminary Rendition of Signal at LOQ #1 445. This Processed Preliminary Rendition 445 is further processed by Reconstructor 450 along with Residual Data 420, producing Enhanced Rendition of Signal at LOQ #1 460. For example, the Reconstructor 450 may comprise processes similar to those performed by the Reconstructor of LOQ #1 320 in FIG. 3, and the Enhanced Rendition of Signal at LOQ #1 460 may correspond to the Rendition of Signal at LOQ #1 337 in FIG. 3. The Enhanced Rendition of Signal at LOQ #1 460 may be enhanced by the addition of the Residual Data 420 and by any processing of the Preliminary Rendition of Signal at LOQ #1 310 performed by the Additional Operations 440. In one case, the Decode Embedded Information block 430 may extract watermarking data 435 and residual data for the quantized symbol 400-1, e.g. the quantized symbol 400-1 may carry both watermarking data 435 and residual data. This for example may be achieved by partitioning the bits of the quantized symbol 400-1 and applying a higher level of quantization to the original symbol representing the transformed coefficients for the residual data. For example, the Decode Embedded Information block 430 may perform operations similar to the Dequantization and Inverse Transform block 410 or may alternatively pass a non-watermarking component of the quantized symbol 400-1 back to Dequantization and Inverse Transform block 410 to derive the residual data. In any case, the Reconstructor 450 may additionally receive residual data for the quantized symbol 400-1.

The Reconstructor 450 thus generates the Enhanced Rendition of Signal at LOQ #1 460 which is further processed by Decoding Operations 465 to produce the Rendition of Signal at LOQ #2 470. The Decoding Operations 465 may be the operations associated with the Generator of Preliminary Rendition at LOQ #2 340 and the Reconstructor of LOQ #2 360 in FIG. 2. Hence, the Rendition of Signal at LOQ #2 470 may be seen to correspond to Rendition 370 in FIG. 3. In FIG. 4, the Rendition of Signal at LOQ #2 470 is processed by Additional Operations 480 along with watermarking information 435 in order to produce a Final Rendition of signal at LOQ #2 490. As described above, Additional Operations 480 may comprise implementing a compliance process to restrict output of the Final Rendition of signal at LOQ #2 490 and/or generate additional metadata such as tags for elements of the Final Rendition of signal at LOQ #2 490. The Additional Operations 480 may comprise interrupting the display of the Final Rendition of signal at LOQ #2 490 based on a result of a compliance process.

In certain cases, if the quantized symbol 400-1 still carries transformed coefficient values (e.g., by splitting bit capacity between the watermarking information and the transformed coefficient values) and/or the transformed coefficient is selected as a coefficient from a larger (e.g., 4 by 4) transform that is found to have reduced visual impact (e.g., an HH coefficient in a 4 by 4 Hadamard transform) then the visual impact on the resulting output signal (e.g., the Final Rendition of signal at LOQ #2 490) is minimised. Additionally, if the transformed coefficient values has reduced accuracy or are replaced at the LOQ #1 level, then the Generator of LOQ #2 Residuals 260 is able to generate residual data that becomes Encoded Data 265 that corrects for the difference between the Preliminary Rendition of Signal at LOQ #2 245 and the Source Signal at LOQ #2 200. This then is an improvement on watermarking standards such as A/335 where there are noticeable black or grey lines with pixel variations at the top of the picture.

An additional benefit of the proposed watermarking method is that the watermarking is performed as part of the encoding and so is not corrupted or modified by subsequent encoding or compression. For example, comparative watermarking standards such as A/335 apply watermarking information to the Source Signal at LOQ #2 200, where this watermarked signal is subsequently encoded. This means that more complex thresholding is required at a receiver as original luma values may be modified as part of the encoding and decoding process (e.g., if this is a lossy process). The presently described approaches are also more secure, as it is more difficult to access and change the picture information; the encoding and decoding operations may be secured and/or the watermarking information itself may be encrypted (e.g., using public key cryptography).

Figure 5:
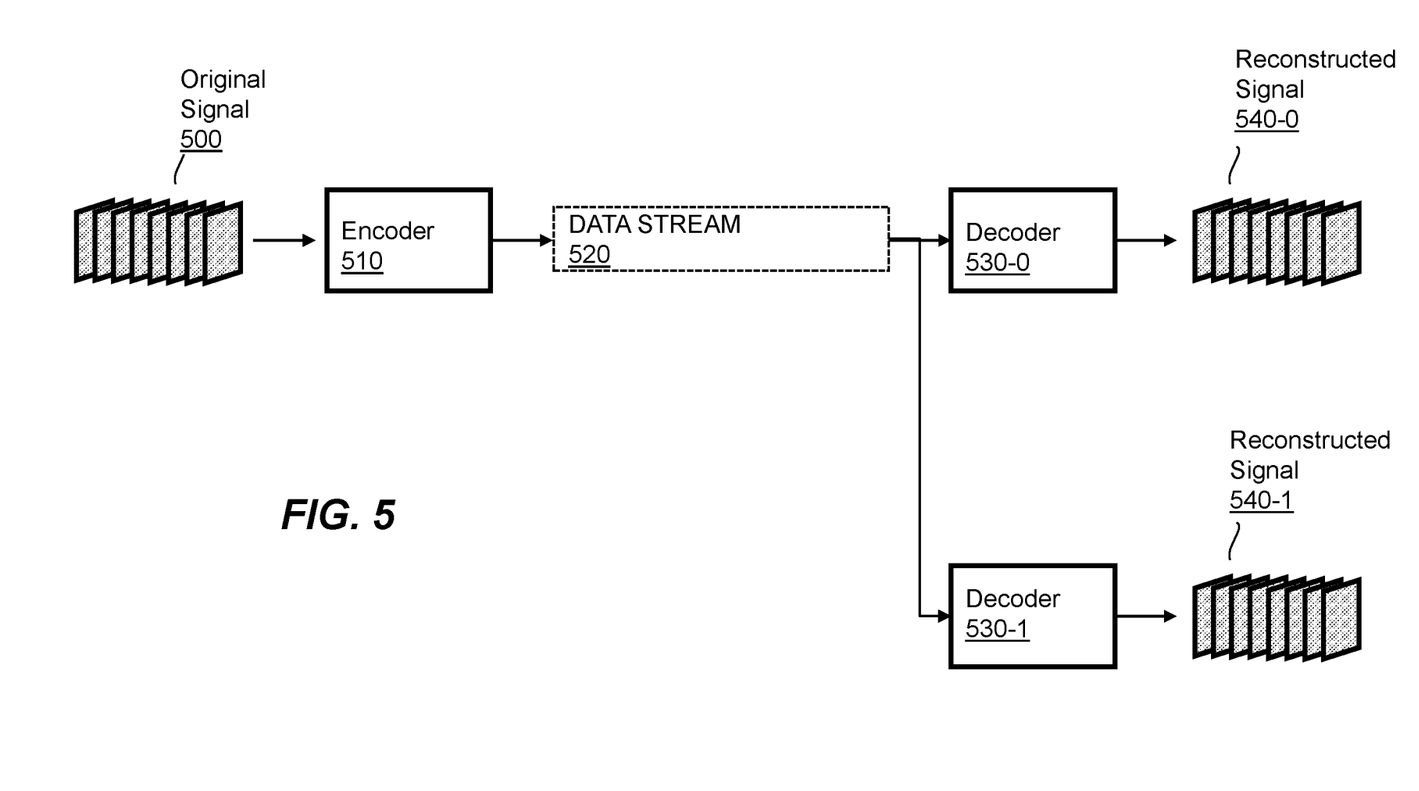
FIG. 5 shows a block diagram of another example of encoding and decoding system in accordance with embodiments.

Referring to FIG. 5, there is shown an example of method implemented within an encoding and decoding system leveraging innovative methods described herein. FIG. 5 shows how the proposed method of embedding watermarking information may be used with legacy decoders. Encoder 510 processes Original Signal 500 to produce Data Stream 520. The Encoder 510 may encode the Data Stream 520 as explained with reference to FIG. 2 and may embed watermarking information within one or more values received in one or more encoded data layers transmitted within the Data Stream 520, wherein said values are associated with transformed coefficients intended to be processed by a decoder for deriving elements of the signal, e.g. as described with respect to either FIG. 2 or FIG. 4.

Data Stream 520 is processed by two decoders. Decoder 530-0 implements signal processing methods according to information signalled by Encoder 510 within reserved symbols, decoding Reconstructed Signal 540-0. The Reconstructed Signal 540-0 may be enhanced with metadata, such as tags or classification information derived from the watermarking information within the reserved symbols.

In FIG. 5, Decoder 530-1 also reconstructs Reconstructed Signal 540-1 but ignores information signalled by Encoder 510 within reserved symbols. In some non-limiting embodiments, Reconstructed Signal 540-1 is a perfectly viable reconstruction of the signal for the given purposes, making additional operations performed by Decoder 530-0 entirely optional. For example, the Decoder 530-1 may be a decoder that applies the decoding process set out in the LCEVC standard, whereas the Decoder 530-0 may be a decoder that implements an out-of-standard decoding process (in certain cases, in addition to the decoding process set out in the LCEVC standard). Hence, additional functionality may be provided based on the watermarking information while maintaining compliance with the LCEVC standard.

In some non-limiting embodiments Decoder 530-0 may at times decide to ignore part of the information signalled by Encoder 510 within reserved symbols. For example, Decoder 530-0 may define whether or not to ignore part of the information signalled within reserved symbols based on information that includes one or more of resolution and framerate of the signal, processing power load at the time of decoding and battery power status.

In certain cases, backwards compatibility, e.g. as explained above, is achieved because the Decoder 530-1 treats the reserved symbols as normal quantized transformed coefficient values and decodes them appropriately. Corrections applied within a tier-based hierarchical format mean that any errors may be corrected. Alternatively, a bit in the encoded Data Stream 520 is used to signal to the Decoders 530 that one or more values should be interpreted as said information rather than actual quantized values of transformed coefficients. In yet another case, a bit depth assigned to a particular transformed coefficient value (e.g. a depth D is 8 or 16 bits) may be shared between the reserved symbols and the (quantized) transformed coefficient values. For example, the n least significant bits of the transformed coefficient values (where n is less than the bit depth, e.g. is 2 or 6 bits) may be used to carry the reserved symbol (i.e. the watermarking information), which represents a more aggressive quantization applied to the transformed coefficient values that carry this symbol but that still enables a coarse level of information (the D-n bits) to be transmitted and used to reconstruct the residual data. Visual impact may be further minimised by selecting a transformed coefficient that is determined (e.g., by experiment) to be less perceptive in a reconstructed output (e.g. H or HH in a 2 by 2 or 4 by 4 Hadamard transform).

Figure 6:
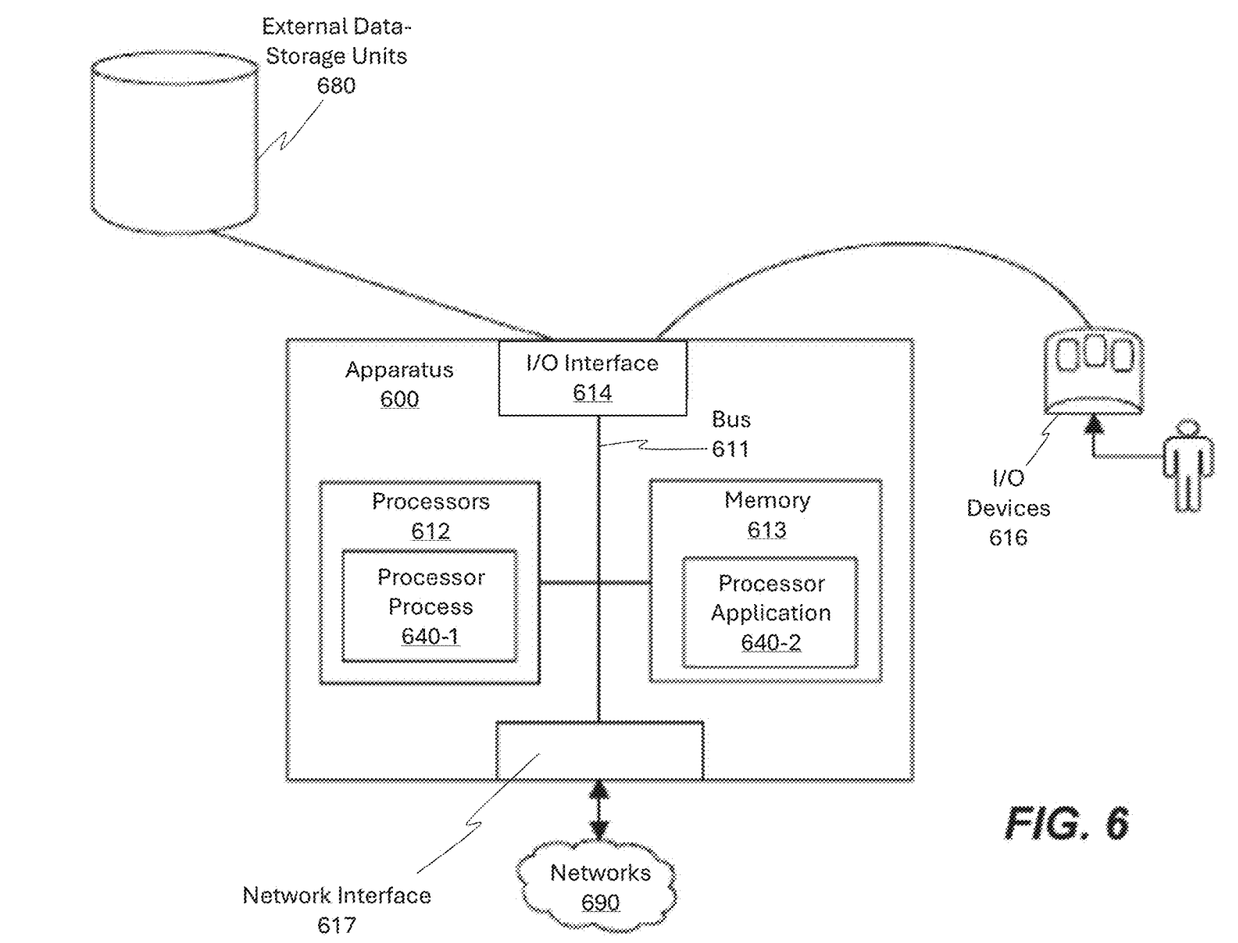
FIG. 6 shows a block diagram of an example of an apparatus in accordance with embodiments.

Referring to FIG. 6, there is shown a schematic block diagram of an example of an apparatus 600.

Examples of the apparatus 600 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 600 comprises one or more processors 612 configured to process information and/or instructions. The one or more processors 612 may comprise a central processing unit (CPU). The one or more processors 612 are coupled with a bus 611. Operations performed by the one or more processors 612 may be carried out by hardware and/or software. The one or more processors 612 may comprise multiple co-located processors or multiple disparately located processors.

In this example, the apparatus 600 comprises computer-useable memory 613 configured to store information and/or instructions for the one or more processors 612. The computer-useable memory 613 is coupled with the bus 611. The computer-useable memory 613 may comprise one or more of volatile and non-volatile memory. The volatile memory may comprise random access memory (RAM). The non-volatile memory may comprise read-only memory (ROM).

In this example, the apparatus 600 comprises one or more external data-storage units 680 configured to store information and/or instructions. The one or more external data-storage units 680 are coupled with the apparatus 600 via an I/O interface 614. The one or more data-storage units 680 may for example comprise a magnetic or optical disk and disk drive or a solid-state drive (SSD).

In this example, the apparatus 600 further comprises one or more input/output (I/O) devices 616 coupled via the I/O interface 614 configured to communicate information to and/or from the one or more processors 612. The apparatus 600 also comprises at least one network interface 617. Both the I/O interface 614 and the network interface 617 are coupled to the systems bus 611. The at least one network interface 617 may enable the apparatus 600 to communicate via one or more data communications networks 690. Examples of data communications networks include, but are not limited to, the Internet and a Local Area Network (LAN). The one or more I/O devices 616 may enable a user to provide input to the apparatus 600 via one or more input devices (not shown). The one or more I/O devices 616 may enable information to be provided to a user via one or more output devices (not shown).

In FIG. 6, a (signal) processor application 640-2 is shown loaded into the memory 1513. This may be executed as a (signal) processor process 640-1 by the processor 612 to implement the methods described herein (e.g. to implement suitable encoders or decoders). The apparatus 600 may also comprise additional features that are not shown for clarity, including an operating system and additional data processing modules. The (signal) processor process 640-1 may be implemented by way of computer program code stored in memory locations within the computer-usable non-volatile memory, computer-readable storage media within the one or more data-storage units and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a data processing module which can be executed by the one or more processors. The data processing module can be configured to include instructions to implement at least some of the operations described herein. During operation, the one or more processors launch, run, execute, interpret or otherwise perform the instructions.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. It will be appreciated that the apparatus 600 may comprise more, fewer and/or different components from those depicted in FIG. 6. The apparatus 600 may be located in a single location or may be distributed in multiple locations. Such locations may be local or remote.

As described in examples herein, a signal processor (e.g., computer processor hardware) is configured to receive data and decode it ("decoder"). The decoder obtains a rendition of the signal at a first (lower) level of quality and detects reserved symbols specifying watermarking information. The decoder reconstructs a rendition of the signal at the second (next higher) level of quality and may apply further processing on the rendition using the watermarking information.

In certain examples described here, reserved symbols may be carried as so-called user data of an encoded data stream. In these examples, signal processing information is embedded in one or more values received in one or more encoded data layers transmitted within the stream of encoded data. The values are associated with transformed coefficients that are processed to derive elements of the signal during the decoding, e.g. they may comprise values for a predefined transformed coefficient within a set of different transformed coefficients that are generated by an encoding transform.

A bit in a bitstream for the encoded data stream may be used to signal the presence of user data. The bit may comprise a user data enabled bit, which may be present in a global configuration header for the encoded data stream. In certain examples, an encoding of user data in place of one of the coefficients may be configured as follows. If the bit is set to "0", then the decoder interprets that data as the relevant transform coefficient. If the bit is set to "1", then the data contained in the relevant coefficient is deemed to be user data, and the decoder is configured to ignore that data, or the relevant coefficient is deemed to carry user data and relevant processes to extract that data is performed. For example, if the bit is set to "1" this may indicate watermarking information is being transmitted.

User data transmitted in this manner may be useful to enable the decoder to obtain supplementary information including, for example, various feature extractions and derivations. Although claimed examples herein relate to watermarking information, it is also possible to use the user data to signal other optional parameters that relate to implementations outside of a standardised implementation.

In one case, a user_data_enabled variable may be a k-bit variable. For example, the user_data_enabled may comprise a 2-bit variable with the following values:

| user_data_enabled | Value of type |
|---|---|
| 0 | disabled |
| 1 | enabled 2-bits |
| 2 | enabled 6-bits |
| 3 | reserved |

In this case, the user data specifying watermarking information may be embedded into the last n (least) significant bits of one or more of the decoded coefficient data sets (e.g., within the encoded residual coefficient data).

When user data is enabled, e.g. to transmit signal processing information as described in examples herein, then the "in-loop" processing of transformed coefficients may be modified. Two examples of this are shown in FIGS. 2 and 4. Further, the decoding of the transformed coefficients may also be adjusted such that, when the user data is enabled, values of the particular transformed coefficient (e.g., H or HH) are set to 0 before the transformed coefficients are subject to an inverse transform. In the case set out in the table above, following extraction of the least significant n bits as reserved symbols, values of the transformed coefficient used to carry the user data may be shifted right (e.g., bit shifted) by 2 bits (>>2) if n=2 (e.g., user_data_enabled=1) or shifted right (e.g., bit shifted) by 6 bits (>>6) if n=6 (e.g., user_data_enabled=1). In one case, if the values of the transformed coefficients are D-bits in length, where D>n, n being the length of the user data in bits (e.g., 2 or 6 in the table above), then the remaining D-n bits for the transformed coefficient may be used to carry a value for the transformed coefficient (e.g., a more heavily quantised integer value compared to a full D-bit representation). In this case, the user data and the value for the transformed coefficient may be partitioned across the D-bits. In other simpler cases, the user data may be extracted and the value of the transformed coefficient may be set to 0 (i.e. such that the value of the transformed coefficient has no effect on the output of the inverse transform).

In certain examples, the user data that is used to implement the reserved symbols may be formatted according to a defined syntax. This defined syntax may partition the user data into header data and payload data. In this case, decoding of the user data may comprise parsing a first set of values received in one or more encoded data layers to extract the header data and parsing a second subsequent set of values received in one or more encoded data layers to extract the payload data. The header data may be set as a first set of a defined number of bits. For example, in the examples above with user data being defined in 2- or 6-bit values, the first x values may comprise the header data. In one case, x may equal 1, such that the first value for the user data (e.g., the transformed coefficient value for the first coding unit or data block of a given frame or plane of video) defines the header data (e.g., the 2- or 6-bits of the first value defines the header data).

In certain examples, the header data may indicate at least whether watermarking operations are enabled. In general, the header data may indicate global parameters for the watermarking information and the payload data may indicate local parameters for the watermarking information, i.e. whereby the watermarking information may be localised to one or more coding units comprising m by m blocks of residual data (e.g., 2 by 2 or 4 by 4 blocks). As the watermarking information is encapsulated within reserved symbols for particular coding units, tags and/or classifications (for example) may be applied to localised areas of a signal. For example, tags may indicate where a localised area of a video signal is to be modified and/or replaced.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of performing signal decoding operations on one or more portions of a signal,
    wherein the performing is based at least in part on information embedded in one or more values received in one or more encoded data layers transmitted within a stream of encoded data,
    wherein said values are associated with transformed coefficients intended to be processed by a decoder for deriving elements of the signal,
    wherein said information comprises an indication of watermarking information associated with the signal,
    wherein the stream of encoded data is comprised within an encoded bitstream, and
    wherein at least one bit in the encoded bitstream is used to signal to the decoder that one or more values should be interpreted as said information rather than actual quantized values of transformed coefficients.

2. The method according to claim 1, wherein the one or more values are interpreted by the decoder to derive said information rather than to derive values of transformed coefficients.

3. The method according to claim 1, wherein the signal is encoded by means of a tier-based hierarchical format.

4. The method according to claim 3, wherein the embedded signaling is included in a residual layer at a resolution lower than the full resolution of the signal.

5. The method according to claim 4, wherein at least one of the signal decoding operations performed based on the embedded signaling is performed in-loop on an intermediate rendition of the signal at a resolution lower than full resolution.

6. The method according to claim 1, wherein the decoder selectively implements signal decoding operations based on a target level of processing power or battery power consumption to be used by the decoder device.

7. The method according to claim 1, wherein the watermarking information indicates that the decoder should initiate application of a watermarking operation to the decoded signal.

8. The method according to claim 1, wherein the watermarking information comprises compliance information associated with the signal.

9. The method according to claim 8, wherein the compliance information comprises any of the following information: the way the signal has been generated, the specific encoder version with which the signal has been generated, the licensing information associated with the signal and/or the encoder version which has generated the signal.

10. The method according to claim 8, comprising, upon decoding said watermarking information, prompting the decoder to initiate a compliance process on the signal, wherein the compliance process comprises initiating interruption of a display of the signal.

11. The method according to claim 1, wherein the watermarking information comprises a tag associated with one or more elements of the signal.

12. The method according to claim 11, wherein the tag comprises identification of whether an element of the signal can be selected by an end user of the signal.

13. The method according to claim 11, wherein the tag identifies:
whether an element of the signal is linked to an action to be taken by the end user of the signal, wherein said action comprises clicking on said element; or
an element of the signal as belonging to a class of objects.

14. The method according to claim 1, wherein the format in which at least a portion of the signal and the watermarking information are encoded is MPEG-5 Part 2 LCEVC ("Low Complexity Enhancement Video Coding") or SMPTE VC-6 ST-2117.

15. A method of encoding a signal comprising:
encoding transformed coefficients for signal reconstruction by reserving one or more quantized symbols of a given coefficient group to provide embedded signaling information for signal decoding operations to be performed on one or more portions of the signal, wherein said information comprises an indication of watermarking information associated with the signal; and
toggling at least one bit in an encoded bitstream for the signal to indicate to the decoder whether a given set of symbols in a given set of residual data is to be interpreted as residual data or as additional embedded signaling information carrying watermarking information.

16. The method according to claim 15, wherein said encoding uses a tier-based hierarchical coding method.

17. A decoder configured to:
perform signal decoding operations on one or more portions of a signal,
wherein the performing is based at least in part on information embedded in one or more values received in one or more encoded data layers transmitted within a stream of encoded data,
wherein said values are associated with transformed coefficients intended to be processed by a decoder for deriving elements of the signal,
wherein said information comprises an indication of watermarking information associated with the signal,
wherein the stream of encoded data is comprised within an encoded bitstream, and
wherein at least one bit in the encoded bitstream is used to signal to the decoder that one or more values should be interpreted as said information rather than actual quantized values of transformed coefficients.

18. An encoder configured to:
encode transformed coefficients for signal reconstruction by reserving one or more quantized symbols of a given coefficient group to provide embedded signaling information for signal decoding operations to be performed on one or more portions of the signal, wherein said information comprises an indication of watermarking information associated with the signal; and
toggling at least one bit in an encoded bitstream for the signal to indicate to the decoder whether a given set of symbols in a given set of residual data is to be interpreted as residual data or as additional embedded signaling information carrying watermarking information.

* * * * *